United States Patent
Kato (10) Patent No.: US 11,634,129 B2
(45) Date of Patent: Apr. 25, 2023

(54) TRAVEL CONTROL APPARATUS, VEHICLE, TRAVEL CONTROL METHOD, AND NON-TRANSITORY COMPUTER-READABLE STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 17/198,553

(22) Filed: Mar. 11, 2021

(65) Prior Publication Data

US 2021/0284149 A1    Sep. 16, 2021

(30) Foreign Application Priority Data

Mar. 16, 2020    (JP) .............................. JP2020-045516

(51) Int. Cl.
*B60W 30/12*    (2020.01)
*B60W 50/14*    (2020.01)
(Continued)

(52) U.S. Cl.
CPC .......... *B60W 30/12* (2013.01); *B60W 50/082* (2013.01); *B60W 50/14* (2013.01);
(Continued)

(58) Field of Classification Search
CPC .... B60W 30/12; B60W 50/082; B60W 50/14; G06V 20/588
(Continued)

(56) References Cited

U.S. PATENT DOCUMENTS

| 10,515,278 B2 | 12/2019 | Ide |
| 2003/0120414 A1* | 6/2003 | Matsumoto ........... B60W 30/12 180/170 |

(Continued)

FOREIGN PATENT DOCUMENTS

| JP | 2016-190519 A | 11/2016 |
| JP | 2018-103863 A | 7/2018 |

OTHER PUBLICATIONS

Japanese Office Action for Japanese Patent Application No. 2020-045516 dated Dec. 23, 2021 (partially translated).

*Primary Examiner* — Peter D Nolan
*Assistant Examiner* — Luke Huynh
(74) *Attorney, Agent, or Firm* — Thomas | Horstemeyer, LLP (57) ABSTRACT

There is provided a travel control apparatus. A recognition unit recognizes a division line of a road on which a self-vehicle is traveling. A control unit executes lane maintenance control to perform lane maintenance of the self-vehicle based on a recognition result of the division line by the recognition unit. If the recognition unit has become unable to recognize the division line in a case in which a first control state for executing the lane maintenance control without issuance of a steering wheel gripping request is set, the control unit will allow preceding vehicle following control, for following a preceding vehicle of the self-vehicle, to be executed after switching the lane maintenance control to manual driving.

11 Claims, 5 Drawing Sheets

(51) Int. Cl.
  *B60W 50/08* (2020.01)
  *G06V 20/56* (2022.01)
  *B60W 50/00* (2006.01)

(52) U.S. Cl.
  CPC ..... *G06V 20/588* (2022.01); *B60W 2050/007* (2013.01); *B60W 2556/40* (2020.02); *B60W 2556/50* (2020.02)

(58) Field of Classification Search
  USPC .......................................................... 701/41
  See application file for complete search history.

(56) References Cited

U.S. PATENT DOCUMENTS

| | | |
|---|---|---|
| 2016/0288790 A1 | 10/2016 | Aoki et al. |
| 2018/0181820 A1 | 6/2018 | Ide |
| 2019/0146489 A1* | 5/2019 | Zaizen ................ G05D 1/0088 701/42 |

* cited by examiner

TRAVEL CONTROL APPARATUS, VEHICLE, TRAVEL CONTROL METHOD, AND NON-TRANSITORY COMPUTER-READABLE STORAGE MEDIUM

CROSS-REFERENCE TO RELATED APPLICATION

This application claims priority to and the benefit of Japanese Patent Application No. 2020-045516 filed on Mar. 16, 2020, the entire disclosure of which is incorporated herein by reference.

BACKGROUND OF THE INVENTION

Field of the Invention

The present invention relates to a travel control apparatus, a vehicle, a travel control method, and a non-transitory computer-readable storage medium.

Description of the Related Art

A vehicle that can recognize a division line of a road on which the self-vehicle is traveling and execute lane maintenance control to maintain the travel lane based on the recognized division line is known. Japanese Patent Laid-Open No. 2018-103863 discloses a technique for switching control, in a vehicle which is performing lane maintenance control, to preceding-vehicle following control for following a preceding vehicle, in a case in which a white line cannot be recognized by a camera sensor.

SUMMARY OF THE INVENTION

According to one embodiment of the present invention, there is provided a travel control apparatus comprising: a recognition unit configured to recognize a division line of a road on which a self-vehicle is traveling; and a control unit configured to execute lane maintenance control to perform lane maintenance of the self-vehicle based on a recognition result of the division line by the recognition unit, wherein if the recognition unit has become unable to recognize the division line in a case in which a first control state for executing the lane maintenance control without issuance of a steering wheel gripping request is set, the control unit will allow preceding vehicle following control, for following a preceding vehicle of the self-vehicle, to be executed after switching the lane maintenance control to manual driving.

According to another embodiment of the present invention, there is provided a travel control apparatus comprising: a recognition unit configured to recognize a division line of a road on which a self-vehicle is traveling; and a control unit configured to execute lane maintenance control to perform lane maintenance of the self-vehicle based on a recognition result of the division line by the recognition unit, wherein in a case in which a first control state for executing the lane maintenance control without issuance of a steering wheel gripping request is set, the control unit will switch the lane maintenance control to manual driving when the recognition unit has become unable to recognize the division line, and in a case in which a second control state for executing the lane maintenance control with the issuance of the steering wheel gripping request is set, the control unit will switch from the lane maintenance control to preceding vehicle following control, for following a preceding vehicle of the self-vehicle, when the recognition unit has become unable to recognize the division line.

According to still another embodiment of the present invention, there is provided a travel control method comprising: recognizing a division line of a road on which a self-vehicle is traveling; and performing control, in a case in which lane maintenance control for performing lane maintenance of the self-vehicle based on the recognition result of the division line in the recognizing is executed and the division line has become unable to be recognized in the recognizing, to allow preceding vehicle following control, for following a preceding vehicle of the self-vehicle, to be executed, after the lane maintenance control is switched to manual driving, based on a fact that a condition related to one of an elapsed time and a traveled distance since the division line has become unable to be recognized has been satisfied.

According to still yet another embodiment of the present invention, there is provided a non-transitory computer-readable storage medium storing a program for causing a computer to function as each unit of a recognition unit configured to recognize a division line of a road on which a self-vehicle is traveling; and a control unit configured to perform control, in a case in which lane maintenance control for performing lane maintenance of the self-vehicle based on the recognition result of the division line by the recognition unit is executed and the recognition unit has become unable to recognize the division line, to allow preceding vehicle following control, for following a preceding vehicle of the self-vehicle, to be executed, after the lane maintenance control is switched to manual driving, based on a fact that a condition related to one of an elapsed time and a traveled distance since the division line has become unable to be recognized has been satisfied.

DESCRIPTION OF THE EMBODIMENTS

In the above-described related art, it is preferable to switch from lane maintenance control to preceding vehicle following control at a more appropriate timing in accordance with the state of the periphery, the control state of the self-vehicle, or the like.

An embodiment of the present invention provides a technique to switch from lane maintenance control to preceding vehicle following control at an even more appropriate timing.

First Embodiment

Figure 1:
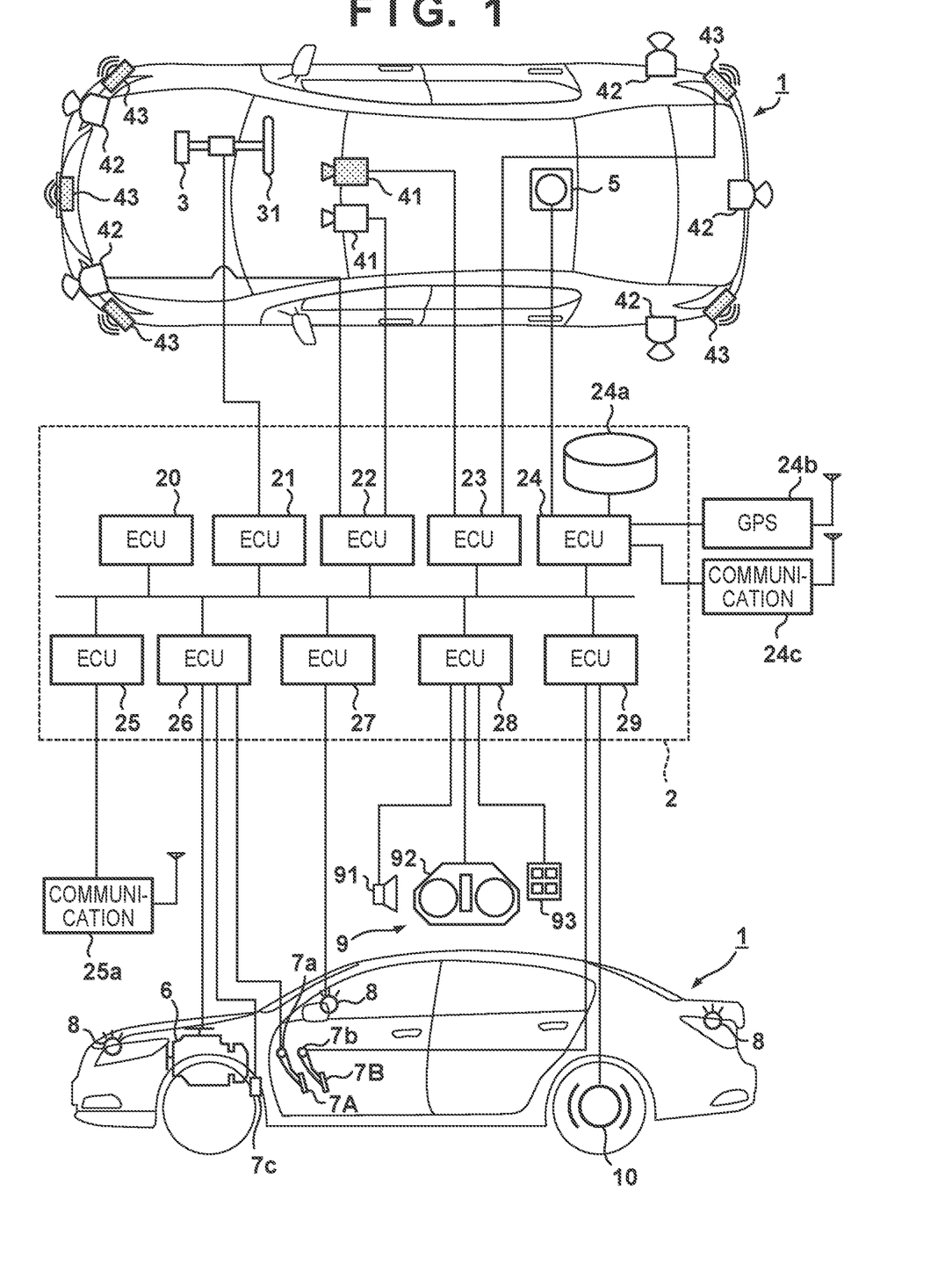
FIG. 1 is a block diagram of a vehicle control apparatus according to an embodiment.

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle. Note that in the following description, the left and right directions are based on a state facing the direction of forward movement of the vehicle 1.

A vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, each ECU may include a dedicated integrated circuit such as an ASIC or the like for executing the processing of each ECU instead of these components.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, the ECU 20 will execute control to stop the vehicle 1 by automatically controlling at least the steering of the vehicle 1. In this manner, from one aspect, the ECU 20 functions as a travel control apparatus of the vehicle 1.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, radars, and sonars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and obtains these pieces of information. The ECU 24 can access a map information database 24a formed in the storage device of the control unit 2. The ECU 24 searches for a route from the current position to the destination based on these pieces of map information. Note that the ECU 24 may obtain the map information by only the wireless communication via the communication device 24c, may obtain the map information by only the database 24a constructed in the storage device of the control unit 2, or may obtain the map information by using both of these methods.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7*b* provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stationary state of the vehicle 1. In addition, if the transmission of the power plant 6 includes a parking lock mechanism, it can be operated to maintain the stationary state of the vehicle 1.

<Switching of Travel Control by Control Unit>

Figure 2:
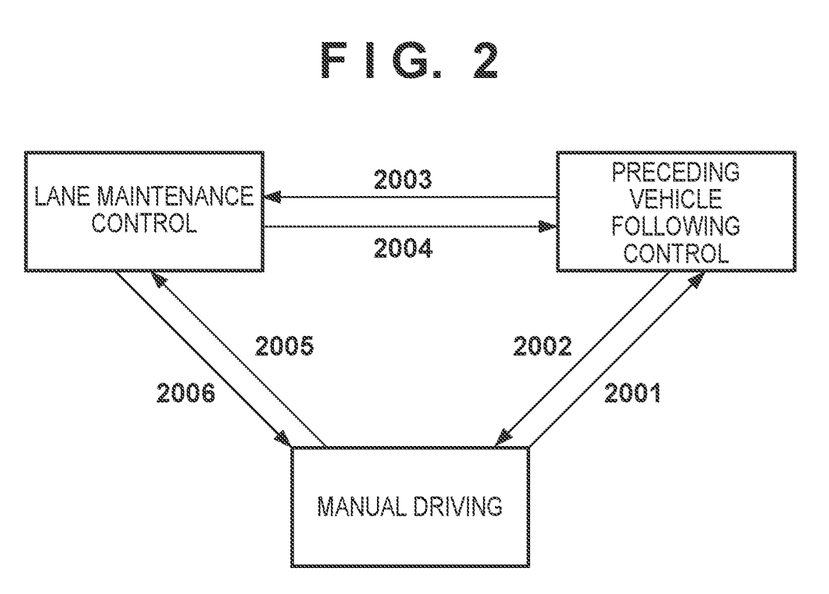
FIG. 2 is a view showing the switching of travel control of a vehicle by a control unit.

FIG. 2 is a view showing the switching of travel control of the vehicle 1 by the control unit 2. In this embodiment, the ECU 20 of the control unit 2 controls the travel of the vehicle 1 by switching the control to be executed between manual driving, preceding vehicle following control, and lane maintenance control.

Manual driving is driving performed under a state in which steering and acceleration/deceleration of the vehicle 1 are not automatically controlled by the ECU 20. For example, the electric power steering device 3, the power plant 6, the brake device 10, and the like are controlled by the corresponding ECUs in the control unit 2 in accordance with the operation of the steering wheel 31, the accelerator pedal 7A, and the brake pedal 7B by the driver.

Preceding vehicle following control is control performed to cause the vehicle 1 as the self-vehicle to follow a preceding vehicle. In one embodiment, the ECU 20 periodically recognizes the preceding vehicle by the cameras 41 or the like to estimate the track of the preceding vehicle, and controls the steering or the acceleration/deceleration of the vehicle 1 so the vehicle 1 will follow the estimated track of the preceding vehicle.

Lane maintenance control is control, performed based on division line recognition result obtained by the camera 41 or the like, to maintain travel on the travel lane of the vehicle 1 as the self-vehicle (lane keep assist). In one embodiment, the ECU 22 uses the corresponding camera 41 or the like to recognize each division line of the travel lane on which the vehicle 1 is traveling, and the ECU 20 controls, based on the recognition result, the steering or the acceleration/deceleration of the vehicle 1 so the vehicle 1 will travel in the center of the travel lane.

An example of conditions in which the control unit 2 will switch the control will be described next. Note that the conditions to be described below are merely an example and can be changed appropriately.

A switch from manual driving to preceding vehicle following control (an arrow 2001 in FIG. 2) is executed in a case in which an occupant has made an operation, such as turning on a switch which is arranged in the vehicle to start automated driving or the like, and the ECU 20 has determined that the preceding vehicle can be followed. For example, the ECU 20 will determine that the preceding vehicle can be followed if the preceding vehicle has been captured by the camera 41 or the like and a predetermined length or more of the track of the preceding vehicle has been stored in the memory or the like of the ECU 22. Also, in one embodiment, if it is determined that the preceding vehicle following control is possible while manual driving is being performed, the ECU 20 may use an indicator or the like that is provided in the vehicle to notify the occupant of the fact that preceding vehicle following control can be performed.

A switch from preceding vehicle following control to manual driving (an arrow 2002 in FIG. 2) will be performed in a case in which the ECU 20 has determined that the preceding vehicle has been lost. For example, the ECU 20 will determine that the preceding vehicle has been lost in a case in which the preceding vehicle cannot be captured by the camera 41 or the like anymore. When switching from the preceding vehicle following control to manual driving, the ECU 20 can request (takeover request) the driver to switch to manual driving.

A switch from the preceding vehicle following control to the lane maintenance control (an arrow 2003 in FIG. 2) is performed in a case in which the state has changed from a state in which the ECU 22 cannot recognize each division line of the travel lane to a state in which the ECU 22 is recognizing each division line. That is, this transition is performed in a case in which the ECU 22 has detected the travel lane.

A switch from the lane maintenance control to the preceding vehicle following control (an arrow 2004 in FIG. 2) is performed in a case in which the state has changed from a state in which the ECU 22 is recognizing each division line to a state in which the ECU 22 cannot recognize each division line. That is, this transition is performed in a case in which the ECU 22 has lost the travel lane.

In this manner, according to this embodiment, the ECU 20 will perform preceding vehicle following control in a state in which the ECU 22 cannot recognize each division line, but will switch to the lane maintenance control when the ECU 22 can recognize each division line.

A switch from the lane maintenance control to manual driving (an arrow 2006 in FIG. 2) is performed when the state changes to a state (lane lost state) in which the ECU 22 cannot recognize each division line from the detection result of the camera 41 or the like. In one embodiment, the ECU 20 can request (takeover request) the driver to switch to manual driving when the lane maintenance control is to be switched to manual driving.

A switch from manual driving to lane maintenance control (an arrow 2005 in FIG. 2) is performed in a case in which the occupant has made an operation, such as turning on the switch for starting automated driving or the like, and the ECU 20 has determined that the lane maintenance control can be executed. For example, the ECU 20 will determine that the lane maintenance control can be executed in a case in which the ECU 22 can recognize each division line from the detection result of the corresponding camera 41 or the like. Also, in one embodiment, if it is determined that the lane maintenance control is possible while manual driving is being performed, the ECU 20 may use an indicator or the like that is provided in the vehicle to notify the occupant of the fact that the lane maintenance control can be performed.

Note that in a case in which it is possible to switch to either the preceding vehicle following control or the lane maintenance control from manual driving, the ECU 20 may be set to preferentially switch to one of them or may determine to switch to one of them in accordance with the state of the vehicle 1 and the periphery. In addition, an input from the occupant may be accepted so that the occupant will be able to select to switch the control operation to either the preceding vehicle following control or the lane maintenance control.

When control is to be switched from the lane maintenance control to the preceding vehicle following control, the vehicle 1 may behave in a manner not intended by the driver. For example, the vehicle 1 may make a lane change in accordance with the preceding vehicle depending on the timing of the lane change of the preceding vehicle. Hence, it is preferable for the control operation to be switched from the lane maintenance control to the preceding vehicle following control at a more appropriate timing in accordance with the state of the periphery, the control state of the self-vehicle, and the like. Therefore, the control unit 2 according to this embodiment will execute the following processing when the lane maintenance control is executed.

<Processing Example 1 of Control Unit>

Figure 3:
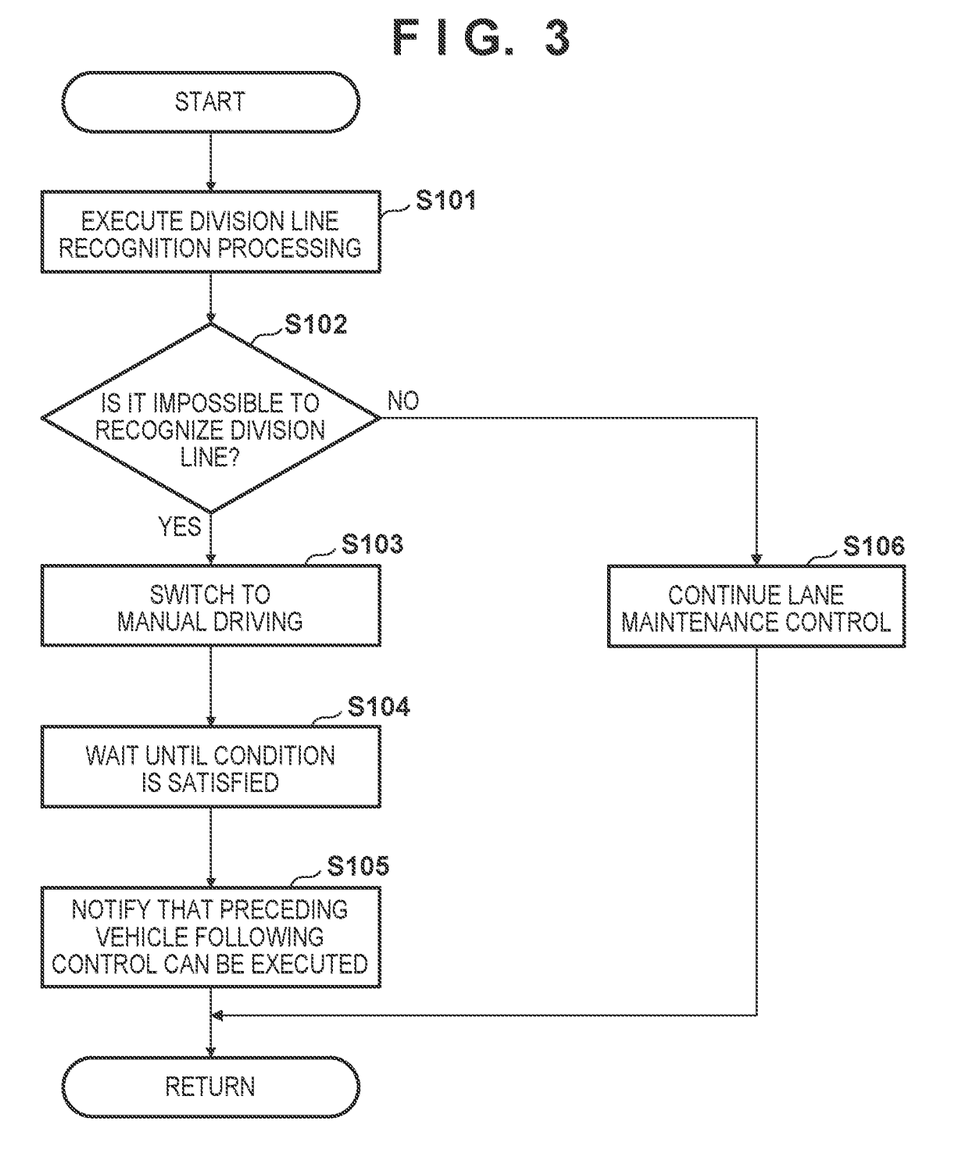
FIG. 3 is a flowchart showing an example of processing of the control unit.

FIG. 3 is a flowchart showing an example of the processing of the control unit 2, and shows an example of the processing of the vehicle 1. More specifically, FIG. 3 shows an example of the processing performed in a case in which the control unit 2 has become unable to execute the lane maintenance control. The control unit 2 can periodically execute this processing while the lane maintenance control is executed. An example in which the lane maintenance control is already executed in the initial state will be described hereinafter.

The processing of FIG. 3 is implemented by, for example, the processor of each ECU of the control unit 2 executing a program stored in the ECU. Alternatively, at least the processes of some of the steps may be executed by dedicated hardware (for example, a circuit).

In step S101, the ECU 22 executes division line recognition processing. For example, the ECU 22 recognizes, based on the detection result of the corresponding camera 41 or the like, each division line of the road on which the vehicle 1 is traveling. Also, for example, the ECU 22 can obtain, based on this recognition result, various kinds of information such as the type of the line, the width, the angle, and the like of the division line. Note that in a case in which each division line cannot be recognized (a case in which the lane has become lost), the ECU 22 will store this fact in its own memory or the like.

In step S102, based on the processing performed by the ECU 22 in step S101, the ECU 20 will advance the process to step S103 if each division line could not be recognized or will advance the process to step S106 if each division line has been recognized. In step S106, the ECU 20 will continue the lane maintenance control, and end the current processing cycle.

In step S103, the ECU 20 switches the control operation from the lane maintenance control to manual driving. Subsequently, in step S104, the ECU 20 will wait until a condition related to an elapsed time or a traveled distance since the ECU 22 has become unable to recognize the division line is satisfied. For example, the ECU 20 may determine that the condition has been satisfied in a case in which a predetermined time of 5 sec to 60 sec has elapsed since the ECU 22 has become unable to recognize the division line. More specifically, for example, the ECU 20 may determine that the condition has been satisfied in a case in which a predetermined time of 20 sec to 40 sec has elapsed since the ECU 22 has become unable to recognize the division line. In addition, for example, the ECU 20 may determine that the condition has been satisfied in a case in which the vehicle 1 has traveled a predetermined distance of 100 m to 1200 m since the ECU 22 has become unable to recognize the division line. More specifically, the ECU 20 may determine that the condition has been satisfied in a case in which the vehicle 1 has traveled a predetermined distance of 400 m to 800 m since the ECU 22 has become unable to recognize the division line.

In step S105, the ECU 20 notifies the driver that the preceding vehicle following control can be executed. The ECU 20 may use an indicator provided in the vehicle 1, perform sound output, or the like to notify the driver of the fact that the preceding vehicle following control can be executed.

As described above, in this embodiment, the control unit 2 executes the lane maintenance control of the vehicle 1 as the self-vehicle by using the division line recognition result of the camera 41 or the like. In a case in which the camera 41 or the like has become unable to recognize the division line or the like, the control unit 2 will allow, after switching the control operation from the lane maintenance control to manual driving, the preceding vehicle following control to be executed based on the fact that a condition related to the elapsed time or the traveled distance since the ECU 22 has become unable to recognize the division line is satisfied. Hence, the ECU 20 can suppress the control operation from being switched to the preceding vehicle following control in a case in which the ECU 22 has become unable to recognize the division line. As a result, it is possible to suppress the self-vehicle from behaving in a manner not intended by the occupant when a delay in the response of the occupant tends to occur such as when the control state has just changed.

In addition, in this embodiment, it will be possible to execute the preceding vehicle following control when the predetermined condition has been satisfied after the control operation has switched to manual driving. Thus, the control operation will change from manual driving to the preceding vehicle following control in a state in which it is highly possible that the driver is gripping the steering wheel. Hence, even in a case in which the preceding vehicle has made a lane change at the timing at which the control operation has switched to the preceding vehicle following control and the vehicle 1 correspondingly tries to make a lane change that is not intended by the driver, the driver can intervene in the driving operation more easily. Therefore, the control operation can be switched from the lane maintenance control to the preceding vehicle following control at an appropriate timing.

Note that, if the ECU 20 receives a request to execute the preceding vehicle following control from the driver while waiting for the condition to be satisfied in the process of step S104, the ECU 20 may execute the preceding vehicle following control without waiting for the condition to be satisfied. As a result, the ECU 20 can switch the control operation to the preceding vehicle following control at an early timing when a request is received from the driver. In addition, it can be assumed that the driver has recognize the state of the preceding vehicle when the driver himself/herself is to request the execution of the preceding vehicle following control. Hence, in such a case, even if the ECU 20 switches the control operation to the preceding vehicle following control before the condition of the process of step S104 has been satisfied, the driver who has recognized the state of the preceding vehicle following control will be able to make an appropriate response when the vehicle 1 behaves in a manner not intended by the occupant.

Second Embodiment

An arrangement that considers a steering wheel gripping request to a driver will be described in the second embodiment. The same reference numerals will denote components similar to those of the first embodiment, and a description thereof will be omitted below.

<Control State Transition by Control Unit>

Figure 4:
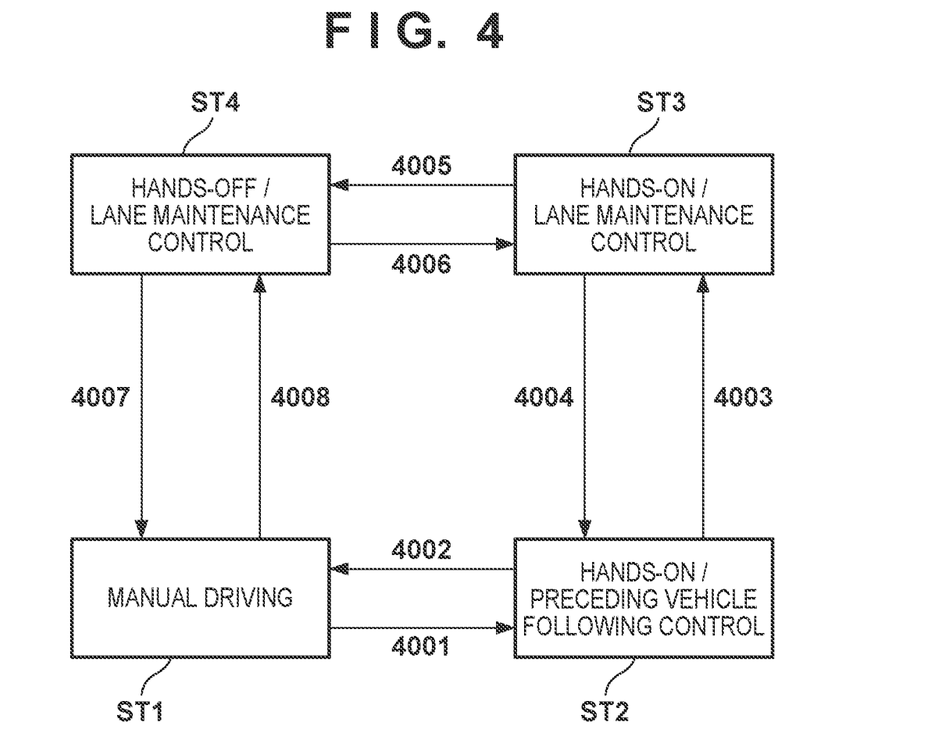
FIG. 4 is a state transition diagram showing a control state transition of a vehicle by a control unit.

FIG. 4 is a view showing a control state transition of the travel control of a vehicle 1 by a control unit 2. In this embodiment, an ECU 20 of the control unit 2 will control the travel of the vehicle 1 by transitioning between four control states ST1 to ST4.

The control state ST1 is a state in which manual driving is performed by the driver. In the control state ST1, the ECU 20 does not execute automated control of steering and acceleration/deceleration of the vehicle 1. From one aspect, it can be said that the control state ST1 is a standby state before the ECU 20 executes control related to the automated driving of the vehicle 1.

The control state ST2 is a "hands-on/preceding vehicle following control" state. In other words, the control state ST2 is a state in which the ECU 20 executes preceding vehicle following control, for causing the vehicle 1 as the self-vehicle to follow a preceding vehicle, while requesting the driver to grip the steering wheel. In one embodiment, an ECU 22 uses a corresponding camera 41 or the like to periodically recognize the preceding vehicle and estimate the track of the preceding vehicle, and the ECU 20 controls the steering or the acceleration/deceleration of the vehicle 1 so that the vehicle 1 will follow the estimated track of the preceding vehicle. Also, in one embodiment, the control state ST2 can be a control state set in a case in which the ECU 20 can follow the preceding vehicle, but is unable to recognize the division line of the travel lane on which the vehicle 1 is traveling.

The control state ST3 is a "hands-on/lane maintenance control" state. In other words, the control state ST3 is a state in which the ECU 20 executes lane maintenance control of the vehicle 1 while requesting the driver to grip the steering wheel. In one embodiment, the ECU 22 will use the corresponding camera 41 or the like to recognize each division line of the travel lane on which the vehicle 1 is traveling, and the ECU 20 controls, based on this recognition result, the steering or the acceleration/deceleration of the vehicle 1 so that the vehicle 1 will travel in the center of the travel lane. For example, the control state ST3 can be a control state set in a case in which the ECU 22 has recognized each division line of the travel lane on which the vehicle 1 is traveling but the map information of the periphery could not be obtained from a communication device 24c. Also, for example, the control state ST3 can be a control state set in a case in which the consistency between each division line recognized by the ECU 22 and the map information obtained by the communication device 24c has not been established.

The control state ST4 is a "hands-off/lane maintenance control" state. In other words, the control state ST4 is a state in which the ECU 20 executes the lane maintenance control of the vehicle 1 without requesting the driver to grip the steering wheel. In one embodiment, in a state in which the division line recognition result of the travel lane on which the vehicle 1 is traveling obtained by the camera 41 or the like and the map information obtained by the communication device 24c have matched, the ECU 20 will control the steering or the acceleration/deceleration of the vehicle 1 so that the vehicle 1 will travel in the center of the travel lane. That is, the control state ST4 can be a control state that is set when the division line recognition result obtained by the camera 41 or the like and the map information obtained by the communication device 24c match.

An example of the condition of the state transition between the control states will be described next. Note that the transition conditions to be described below are merely an example and can be changed appropriately.

A transition from the control state ST1 to the control state ST2 (an arrow 4001 in FIG. 4) is executed in a case in which an occupant has performed an operation, such as turning on a switch provided in the vehicle to start automatic driving or the like, and the ECU 20 has determined that the preceding vehicle can be followed. For example, the ECU 20 will determine that the preceding vehicle can be followed if the preceding vehicle has been captured by the camera 41 or the like and a predetermined length or more of the track of the preceding vehicle has been stored in the memory or the like of the ECU 22. Also, in one embodiment, if it is determined that the preceding vehicle following control is possible in the control state ST1, the ECU 20 may use an indicator or the like that is provided in the vehicle to notify the occupant of the fact that preceding vehicle following control can be performed.

A transition from the control state ST2 to the control state ST1 (an arrow 4002 in FIG. 4) will be performed in a case in which the ECU 20 has determined that the preceding vehicle has been lost. For example, the ECU 20 will determine that the preceding vehicle has been lost in a case in which the preceding vehicle cannot be captured by the camera 41 or the like anymore. When transitioning from the control state ST2 to the control state ST1, the ECU 20 can request (takeover request) the driver to switch to manual driving.

A transition from the control state ST2 to the control state ST3 (an arrow 4003 in FIG. 4) is performed in a case in which the state has changed from a state in which the ECU 22 cannot recognize each division line of the travel lane to a state in which the ECU 22 is recognizing each division line. That is, this transition is performed in a case in which the ECU 22 has detected the travel lane.

A transition from the control state ST3 to the control state ST2 (an arrow 4004 in FIG. 4) is performed in a case in which the state has changed from a state in which the ECU 22 is recognizing each division line to a state in which the ECU 22 cannot recognize each division line. That is, this transition is performed in a case in which the ECU 22 has lost the travel lane.

In this embodiment, although the ECU 20 will execute the preceding vehicle following control by the state transition between the control state ST2 and the control state ST3 in a state in which the ECU 22 cannot recognize the division line, the control operation will be switched to the lane maintenance control when the ECU 22 becomes able to recognize each division line. Also, since both the control state ST2 and the control state ST3 are control states which are hands-on states in which the driver is requested to grip the steering wheel, it can be said that a transition between these control states is the switching of the travel control state executed by the ECU 20 in the hands-on state.

A transition from the control state ST3 to the control state ST4 (an arrow 4005 in FIG. 4) is performed when the state changes from a state in which the division line recognition result obtained by the camera 41 or the like and the map information obtained by the communication device 24c do not match to a state in which the division line recognition result and the map information match. For example, the ECU 20 will cause the control state ST3 to transition to the control state ST4 in a case in which the lost map information is obtained and the map information and the division line recognition result have matched.

A transition from the control state ST4 to the control state ST3 (an arrow 4006 in FIG. 4) is performed in a case in which the state changes from a state in which the division line recognition result obtained by the camera 41 or the like and the map information obtained by the communication device 24c match to a state (map lost state) in which the ECU 20 cannot obtain the map information via the communication device 24c or a state in which the division line recognition result and the map information could be matched appropriately. In one embodiment, the ECU 20 can request (hands-on request) the driver to grip the steering wheel when the control state ST4 is to transition to the control state ST3.

In this embodiment, while the ECU 20 will execute, in the control state ST3, the lane maintenance control in the hands-on state in which the driver is requested to grip the steering wheel, the ECU 20 will execute, in the control state ST4, the lane maintenance control in the hands-off state in which the driver is not requested to grip the steering wheel. That is, it can be said that the state transition between the control state ST3 and the control state ST4 is a switch between the hands-on state and the hands-off state in correspondence with the state of the match between the division line recognition result and the map information.

A transition from the control state ST4 to the control state ST1 (an arrow 4007 in FIG. 4) is performed in a case in which the state changes from a state in which the division line recognition result obtained by the camera 41 or the like and the map information obtained by the communication device 24c match to a state in which the ECU 22 cannot recognize the division line (lane lost state). In one embodiment, the ECU 20 can request (takeover request) the driver to switch to manual driving when the control state ST4 is to transition to the control state ST1.

A transition from the control state ST1 to the control state ST4 (an arrow 4008 in FIG. 4) is performed in a case in which the occupant has performed an operation, such as turning on the switch for starting automated driving or the like, and the ECU 20 has determined that the lane maintenance control can be performed in the hands-off state. For example, the ECU 20 will determine that the lane maintenance control in the hands-off state can be performed when the division line recognition result and the map information have matched. Also, in one embodiment, in a case in which it is determined that the lane maintenance control can be performed in the control state ST1, the ECU 20 may use an indicator provided in the vehicle or the like to notify the occupant of the fact that the lane maintenance control can be performed.

Note that if it is possible for the state to transition from the control state ST1 to either the control state ST2 or the control state ST4, the ECU 20 may be set to preferentially transition to one of them or may switch the transition destination in accordance with the state of the vehicle 1 and the periphery. In addition, an input from the occupant may be accepted so that the occupant will be able to select to switch the control state to either the control state ST2 or the control state ST4.

<Processing Example 2 of Control Unit>

Figure 5:
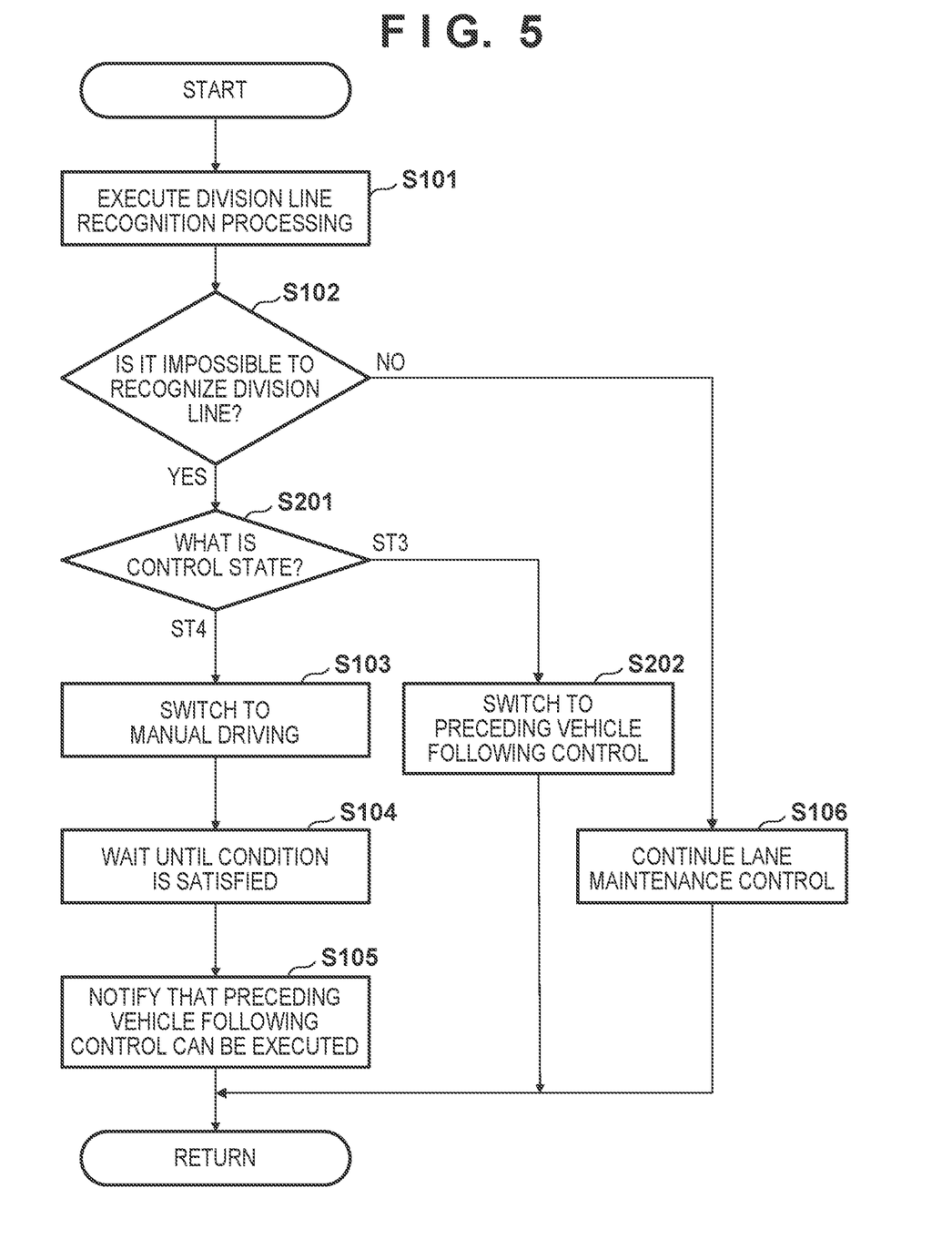
FIG. 5 is a flowchart showing an example of processing of the control unit.

FIG. 5 is a flowchart showing an example of the processing of the control unit 2, and shows an example of the processing of the travel control of the vehicle 1. More specifically, FIG. 5 shows an example of the processing of the control state transition of the control unit 2 in a case in which the control unit 2 has become unable to execute the lane maintenance control. The control unit 2 can periodically execute this processing while automated driving is executed. The control unit 2 can periodically execute this processing while the lane maintenance control is executed hereinafter. An example of a case in which the lane maintenance control has been executed in the initial state, that is, a case in which the control state is the control state ST3 or the control state ST4 will be described below.

The processing of FIG. 5 is implemented by, for example, the processor of each ECU of the control unit 2 executing a program stored in the ECU. Alternatively, at least the processes of some of the steps may be executed by dedicated hardware (for example, a circuit).

The processes of steps S101 and S102 are similar to those of the processing example 1. However, if "YES" is determined in step S102, the ECU 20 will advance the process to step S201 instead of step S103.

In step S201, the ECU 20 confirms the current control state. In a case in which the current control state is the control state ST4, the ECU 20 will advance the process to step S103 and subsequently execute processes similar to those of the processing example 1. In a case in which the current control state is the control state ST3, the process advances to step S202.

In this embodiment, when the control state is the control state ST4 in which the lane maintenance control is executed without issuing a steering wheel gripping request to the driver, the ECU 20 will allow the preceding vehicle following control to be executed based on the fact that a condition related to the time or the distance after the control operation has been switched to manual driving has been satisfied. As a result, it will be possible to suppress a state in which the control operation changes to the preceding vehicle following control in a state in which the driver has his/her hands removed from the steering wheel and the driver's response to an unintended behavior of the vehicle 1 will be delayed. That is, it will be possible to suppress the self-vehicle from behaving in a manner not intended by the occupant when a delay in the response of the occupant tends to occur such as when the control state changes from the hands-off state to a state in which the occupant needs to grip the steering wheel.

In step S202, the ECU 20 switches the control to be executed to the preceding vehicle following control, and ends the current processing cycle. In terms of FIG. 4, the ECU 20 switches the control state from the control state ST3 to the control state ST2.

In this embodiment, in a case in which the control state is the control state ST3 in which the lane maintenance control is executed while issuing a steering wheel gripping request to the driver, the ECU 20 will execute the preceding vehicle following control without switching to manual driving even in a case in which the ECU has become unable to recognize the division line. If the control state ST3 is set as the control state, the driver will be able to intervene in the driving operation even if the vehicle 1 behaved in a manner not intended by the occupant because the driver will be gripping the steering wheel. That is, a state in which there is a delay in the occupant's response to a behavior, of the self-vehicle, that is not intended by the occupant will hardly occur. Thus, by switching the control operation to the preceding vehicle following control without the intervention of manual driving, the ECU 20 can switch the control operation from the lane maintenance control to the preceding vehicle following control in a state in which automated driving is continued.

In addition, if it changes to a state in which the division line cannot be recognized in a case in which the control state is set to the control state ST3, the ECU 20 will execute the preceding vehicle following control regardless of the condition in the process of step S104. As a result, the control operation can be switched to the preceding vehicle following control at an earlier timing in a state in which the driver is gripping the steering wheel.

Furthermore, from one aspect, if it changes to a state in which the division line cannot be recognized in a case in which the control state is set to the control state ST4 in which the lane maintenance control is executed without issuing a steering wheel gripping request to the driver, the ECU 20 will switch the control operation from the lane maintenance control to manual driving. On the other hand, if it changes to a state in which the division line cannot be recognized in a case in which the control state is set to the control state ST3 in which the lane maintenance control is executed while requesting the driver to grip the steering wheel, the ECU 20 will switch the control operation from the lane maintenance control to the preceding vehicle following control. That is, when it changes to a state in which the division line cannot be recognized, the ECU 20 will switch the travel control to be executed in accordance with whether the driver is gripping the steering wheel during the lane maintenance control. It will be possible to switch the control operation to the preceding vehicle following control when the driver can respond to a behavior of the vehicle 1 which is not intended by the driver.

OTHER EMBODIMENTS

Although the above-described embodiments described an example of case in which the ECU 20 controls the automated driving of the vehicle 1, an arrangement according to each of the above-described embodiments can be adopted in also a case in which the lane maintenance control or the preceding vehicle following control is to be performed as the driving support control.

In addition, in relation to the switch from manual driving to the preceding vehicle following control, in a case in which the preceding vehicle following control cannot be executed due to the fact that the camera 41 or the like could not capture a preceding vehicle 99 or a predetermined length or more of the track of the preceding vehicle 99 is not stored in the memory or the like of the ECU 22, the ECU 20 may notify the driver of this fact. For example, the ECU 20 may confirm, before executing the process of step S105, whether preceding vehicle following control can be executed. Subsequently, if it is determined that the preceding vehicle following control can be executed, the process will advance to step S105. Otherwise, the driver may be notified of this determined fact.

Furthermore, in relation to the switch from the lane maintenance control to the preceding vehicle following control, in a case in which the preceding vehicle following control cannot be executed due to the fact that the camera 41 or the like could not capture the preceding vehicle 99 or a predetermined length or more of the track of the preceding vehicle 99 is not stored in the memory or the like of the ECU 22, the ECU 20 may notify the driver of this fact without switching or may stop, in a case in which the driver will not perform manual driving, the vehicle 1 at a position where the self-vehicle can stop. For example, the ECU 20 may confirm, before executing the process of step S202, whether the preceding vehicle following control can be executed. Subsequently, if it is determined that the preceding vehicle following control can be executed, the process will advance to step S202. Otherwise, the ECU 20 may notify, without switching the control operation, the driver of the fact that the preceding vehicle following control cannot be executed or the ECU 20 may stop, in a case in which the driver will not perform manual driving, the vehicle 1 at a position where the self-vehicle can stop.

SUMMARY OF EMBODIMENTS

The above-described embodiments disclose at least a travel control apparatus, a vehicle, a travel control method, and a non-transitory computer-readable program as follows.

1. A travel control apparatus (for example, 2) according to the above-described embodiment comprises:

a recognition unit (for example, 22, S101) configured to recognize a division line of a road on which a self-vehicle is traveling; and a control unit (for example, 20, S106) configured to execute lane maintenance control to perform lane maintenance of the self-vehicle based on a recognition result of the division line by the recognition unit, wherein if the recognition unit has become unable to recognize the division line in a case in which a first control state (for example, ST4) for executing the lane maintenance control without issuance of a steering wheel gripping request is set, the control unit will allow preceding vehicle following control, for following a preceding vehicle of the self-vehicle, to be executed after switching the lane maintenance control to manual driving (for example, S103).

According to this embodiment, in state in which the response of the occupant is likely to be delayed such as in case in which the control state changes from the hands-off state to a state in which the occupant is required to grip the steering wheel, it will be possible to suppress the self-vehicle from behaving in a manner not intended by the occupant. Hence, the control operation can be switched from the lane maintenance control to the preceding vehicle following control at a more appropriate timing.

2. According to the above-described embodiment, in a case in which the recognition unit has become unable to recognize the division line, the control unit will allow the preceding vehicle following control to be executed based on a fact that a condition related to one of an elapsed time and a traveled distance since the division line could not be recognized has been satisfied after the lane maintenance control has been switched to the manual driving (for example, 20, S104, S105).

According to this embodiment, it will be possible to suppress the control operation from being switched to the preceding vehicle following control in a case in which the control unit has become unable to recognize the division line, and it will be possible to suppress the self-vehicle from behaving in a manner not intended by the occupant when a delay in the response of the occupant tends to occur such as when the control state has just changed.

3. According to the above-described embodiment, the apparatus further comprises:

an obtainment unit configured to obtain map information of a periphery of the self-vehicle, wherein the first control state is a control state in which the recognition result of the division line by the recognition unit and the map information obtained by the obtainment unit have been matched.

According to this embodiment, it will be possible to suppress the self-vehicle from behaving in a manner not intended by the occupant in a case in which the state changes from a state in which the division line recognition result and the map information match to a state in which the division line becomes unable to be recognized.

4. According to the above-described embodiment, in a case in which a second control state (for example, ST3) for executing the lane maintenance control with issuance of a steering wheel gripping request is set, the control unit will execute the preceding vehicle following control without switching to the manual driving even in a case in which the recognition unit has become unable to recognize the division line (for example, S202).

According to this embodiment, since the delay in the response of the occupant, to the self-vehicle behaving in a manner not intended by the occupant, is less likely to occur in a case in which the driver is gripping the steering wheel, the control operation can be switched, by switching to the preceding vehicle following control without intervention of manual driving, to the preceding vehicle following control in a state in which automatic driving is continued.

5. According to the above-described embodiment, in a case in which a second control state (for example, ST3) for executing the lane maintenance control with the issuance of the steering wheel gripping request is set, the control unit will execute the preceding vehicle following control regardless of the condition when the recognition unit has become unable to recognize the division line (for example, S202).

According to this embodiment, since the delay in the response of the occupant, to the self-vehicle behaving in a manner not intended by the occupant, is less likely to occur in a case in which the driver is gripping the steering wheel, the control operation can be switched, by executing the preceding vehicle following control regardless of the condition, from the lane maintenance control to the preceding vehicle following control at an earlier timing.

6. According to the above-described embodiment, in a case in which a driver makes a request to execute the preceding vehicle following control, the control unit will execute the preceding vehicle following control even if the condition related to one of the elapsed time and the traveled distance is not yet satisfied.

According to this embodiment, the control operation can be switched to the preceding vehicle following control at an early timing when the switch to the preceding vehicle following control is requested by the driver.

7. A travel control apparatus (for example, 2) according to the above-described embodiment comprises:
a recognition unit (for example, 22) configured to recognize a division line of a road on which a self-vehicle is traveling; and
a control unit (for example, 20) configured to execute lane maintenance control to perform lane maintenance of the self-vehicle based on a recognition result of the division line by the recognition unit,
wherein in a case in which a first control state (for example, ST4) for executing the lane maintenance control without issuance of a steering wheel gripping request is set, the control unit will switch the lane maintenance control to manual driving (for example, S103) when the recognition unit has become unable to recognize the division line (for example, S102. YES), and
in a case in which a second control state (for example, ST3) for executing the lane maintenance control with the issuance of the steering wheel gripping request is set, the control unit will switch from the lane maintenance control to preceding vehicle following control (for example, S202), for following a preceding vehicle of the self-vehicle, when the recognition unit has become unable to recognize the division line (for example, S102: YES).

According to this embodiment, the travel control to be executed when the division line has become unable to be recognized will be switched in accordance with whether the driver is gripping the steering wheel during the lane maintenance control. Hence, the control operation can be switched to the preceding vehicle following control in a case in which the driver can respond to a behavior of the vehicle which is not intended by the driver.

8. A vehicle according to the above-described embodiment comprises a travel control apparatus defined in 1. to 7. described above.

According to this embodiment, a vehicle that can switch the control operation from the lane maintenance control to the preceding vehicle following control at a more appropriate timing can be provided.

9. A travel control method (for example, FIG. 3) according to the above-described embodiment comprises:
recognizing (for example, S101) a division line of a road on which a self-vehicle is traveling; and
performing (for example, S102-S106) control, in a case in which lane maintenance control for performing lane maintenance of the self-vehicle based on the recognition result of the division line in the recognizing is executed and the division line has become unable to be recognized in the recognizing, to allow preceding vehicle following control, for following a preceding vehicle of the self-vehicle, to be executed, after the lane maintenance control is switched to manual driving, based on a fact that a condition related to one of an elapsed time and a traveled distance since the division line has become unable to be recognized has been satisfied.

According to this embodiment, the control operation can be switched from the lane maintenance control to the preceding vehicle following control at a more appropriate timing.

10. A non-transitory computer-readable storage medium according to the above-described embodiments stores a program for causing a computer to function as each unit of
a recognition unit (for example, S101) configured to recognize a division line of a road on which a self-vehicle is traveling; and
a control unit (for example, S102-S106) configured to perform control, in a case in which lane maintenance control for performing lane maintenance of the self-vehicle based on the recognition result of the division line by the recognition unit is executed and the recognition unit has become unable to recognize the division line, to allow preceding vehicle following control, for following a preceding vehicle of the self-vehicle, to be executed, after the lane maintenance control is switched to manual driving, based on a fact that a condition related to one of an elapsed time and a traveled distance since the division line has become unable to be recognized has been satisfied.

According to this embodiment, the control operation can be switched from the lane maintenance control to the preceding vehicle following control at a more appropriate timing.

The invention is not limited to the foregoing embodiments, and various variations/changes are possible within the spirit of the invention.

What is claimed is:
1. A travel control apparatus comprising:
a recognition unit configured to recognize a division line of a road on which a self-vehicle is traveling; and
a control unit configured to execute lane maintenance control to perform lane maintenance of the self-vehicle based on a recognition result of the division line by the recognition unit, wherein if the recognition unit has become unable to recognize the division line in a case in which a first control state for executing the lane maintenance control is set, the control unit will allow preceding vehicle following control, for following a preceding vehicle of the self-vehicle, to be executed after switching the lane maintenance control to manual driving, based on a fact that a condition related to an elapsed time or a traveled distance since the division line could not be recognized has been satisfied, and the control unit notifies a driver that the preceding vehicle following control can be executed after the condition is satisfied.

2. The apparatus according to claim 1, wherein the first control state is a state for executing the lane maintenance control without issuance of a steering wheel gripping request.

3. The apparatus according to claim 2, further comprising:
an obtainment unit configured to obtain map information of a periphery of the self-vehicle,
wherein the first control state is a control state in which the recognition result of the division line by the recognition unit and the map information obtained by the obtainment unit have been matched.

4. The apparatus according to claim 2, wherein in a case in which a second control state for executing the lane maintenance control with issuance of a steering wheel gripping request is set, the control unit will execute the preceding vehicle following control without switching to the manual driving even in a case in which the recognition unit has become unable to recognize the division line.

5. The apparatus according to claim 2, wherein in a case in which a second control state for executing the lane maintenance control with the issuance of the steering wheel gripping request is set, the control unit will execute the preceding vehicle following control regardless of the condition when the recognition unit has become unable to recognize the division line.

6. The apparatus according to claim 2, wherein in a case in which a driver makes a request to execute the preceding vehicle following control, the control unit will execute the preceding vehicle following control even if the condition related to one of the elapsed time and the traveled distance is not yet satisfied.

7. The apparatus according to claim 1, wherein if the recognition unit has become unable to recognize the division line in the case in which the first control state for executing the lane maintenance control is set, the control unit will maintain the manual driving during the condition is not satisfied.

8. A travel control apparatus comprising:
a recognition unit configured to recognize a division line of a road on which a self-vehicle is traveling; and
a control unit configured to execute lane maintenance control to perform lane maintenance of the self-vehicle based on a recognition result of the division line by the recognition unit,
wherein in a case in which a first control state for executing the lane maintenance control without issuance of a steering wheel gripping request is set, the control unit will switch the lane maintenance control to manual driving when the recognition unit has become unable to recognize the division line, and the control unit notifies a driver that preceding vehicle following control can be executed after a condition related to an elapsed time or a traveled distance since the division line could not be recognized is satisfied, and in a case in which a second control state for executing the lane maintenance control with the issuance of the steering wheel gripping request is set, the control unit will switch from the lane maintenance control to the preceding vehicle following control, for following a preceding vehicle of the self-vehicle, when the recognition unit has become unable to recognize the division line.

9. A vehicle comprising a travel control apparatus defined in claim 1.

10. A travel control method executed by a travel control apparatus comprising:
recognizing a division line of a road on which a self-vehicle is traveling;
performing control, in a case in which lane maintenance control for performing lane maintenance of the self-vehicle based on the recognition result of the division line in the recognizing is executed and the division line has become unable to be recognized in the recognizing, to allow preceding vehicle following control, for following a preceding vehicle of the self-vehicle, to be executed, after the lane maintenance control is switched to manual driving, based on a fact that a condition related to one of an elapsed time and a traveled distance since the division line has become unable to be recognized has been satisfied; and
notifying a driver that the preceding vehicle following control can be executed after the condition is satisfied.

11. A non-transitory computer-readable storage medium storing a program for causing a computer to function as each unit of
a recognition unit configured to recognize a division line of a road on which a self-vehicle is traveling; and
a control unit configured to perform control, in a case in which lane maintenance control for performing lane maintenance of the self-vehicle based on the recognition result of the division line by the recognition unit is executed and the recognition unit has become unable to recognize the division line, to allow preceding vehicle following control, for following a preceding vehicle of the self-vehicle, to be executed, after the lane maintenance control is switched to manual driving, based on a fact that a condition related to one of an elapsed time and a traveled distance since the division line has become unable to be recognized has been satisfied,
wherein the control unit notifies a driver that the preceding vehicle following control can be executed after the condition is satisfied.

\* \* \* \* \*